(12) United States Patent
Bjornseth et al.

(10) Patent No.: US 8,281,353 B1
(45) Date of Patent: Oct. 2, 2012

(54) SERVICE CREATION SYSTEM AND METHOD FOR PACKET BASED CELLULAR NETWORKS

(75) Inventors: Lisa Kerry Bjornseth, Thornton, CO (US); David Lee Chavez, Jr., Thornton, CO (US); Mahesh Narasimhan, Broomfield, CO (US); Timothy Mark Larison, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 2471 days.

(21) Appl. No.: 10/954,068

(22) Filed: Sep. 29, 2004

(51) Int. Cl.
  *H04N 7/173* (2011.01)
  *H04N 7/16* (2011.01)
  *H04H 20/71* (2008.01)
  *H04H 20/74* (2008.01)
  *H04H 60/09* (2008.01)
  *H04W 36/00* (2009.01)
  *H04W 72/00* (2009.01)
  *H04W 24/00* (2009.01)
  *H04W 4/00* (2009.01)
  *H04B 7/00* (2006.01)
  *H04B 7/212* (2006.01)

(52) U.S. Cl. ........ 725/105; 725/109; 725/118; 725/148; 455/3.01; 455/3.02; 455/3.04; 455/436; 455/452.2; 455/456.2; 455/456.3; 455/456.5; 455/456.6; 455/524; 370/322; 370/333

(58) Field of Classification Search .................. None
  See application file for complete search history.

(56) References Cited

U.S. PATENT DOCUMENTS

| | | | |
|---|---|---|---|
| 6,269,402 B1 * | 7/2001 | Lin et al. | 709/227 |
| 6,912,544 B1 * | 6/2005 | Weiner | 1/1 |
| 7,027,415 B1 * | 4/2006 | Dahlby et al. | 370/322 |
| 7,058,818 B2 * | 6/2006 | Dariel | 713/189 |
| 7,177,655 B2 * | 2/2007 | Lai et al. | 455/466 |
| 7,200,384 B1 * | 4/2007 | Tervo et al. | 455/414.1 |
| 7,454,401 B2 * | 11/2008 | Yamamoto et al. | 1/1 |
| 7,573,867 B1 * | 8/2009 | Welch | 370/352 |
| 7,590,589 B2 * | 9/2009 | Hoffberg | 705/37 |
| 2001/0003542 A1 * | 6/2001 | Kita | 381/334 |
| 2001/0034784 A1 * | 10/2001 | Holler et al. | 709/223 |
| 2002/0075392 A1 * | 6/2002 | Imaeda | 348/333.05 |
| 2004/0009792 A1 * | 1/2004 | Weigand | 455/561 |
| 2004/0066455 A1 * | 4/2004 | Holmes | 348/207.1 |
| 2005/0154774 A1 * | 7/2005 | Giaffreda et al. | 709/200 |

* cited by examiner

*Primary Examiner* — Nasser Goodarzi
*Assistant Examiner* — Mary A Kay
(74) *Attorney, Agent, or Firm* — John C. Moran

(57) ABSTRACT

A method and apparatus for transmitting audio information and digital images via a wireless switching network by performing the operations of starting a photo or audio session by a digital camera or audio appliance; connecting the digital camera or audio appliance to a wireless telecommunication terminal; reserving bandwidth on the wireless switching network; transmitting digital images or audio information between the digital camera or audio appliance and a centralized database via a first path on the wireless switching network; and establishing a second path for transmission of digital images or audio information upon the first path being interrupted using the reserved bandwidth for the second path.

17 Claims, 8 Drawing Sheets

US 8,281,353 B1

SERVICE CREATION SYSTEM AND METHOD FOR PACKET BASED CELLULAR NETWORKS

TECHNICAL FIELD

This invention relates to cellular and wireless switching systems.

BACKGROUND

Cellular telephones provide a convenient mobile communication media. However, their utilization for the transfer of data is limited because of the problem of the RF reception being interrupted and packets being lost during transmission. Whereas this is not a major problem for the transmission of short email messages or single pictures which can be manually resent if necessary; it does pose a problem for an ongoing communication of data between a device utilizing the cellular telephone for a communication path and an end application. Packet cell technologies are included in CDMA, CDMA-2000, GSM-GPRS, UMTS and 3G protocols. However, none of these protocols describe or incorporate a hosted solution for packet sessions. It is critical for the mobile service provider to offer higher-level sessions meant to survive packet session failures. These services do not exist nor do auto-reconnect technologies on such failures. This greatly decreases the utilization of cellular telephones as a communication path for many types of applications.

SUMMARY

A method and apparatus transmit digital images via a wireless switching network by performing the operations of starting to capture digital images for a photo session by a digital camera; connecting the digital camera to a wireless telecommunication terminal; reserving bandwidth on the wireless switching network; transmitting digital images as each is captured to a centralized database via a first path on the wireless switching network; and establishing a second path for transmission of digital images upon the first path being interrupted using the reserved bandwidth for the second path.

A method and apparatus transmit audio information to an audio appliance connected to a wireless telecommunication terminal via a wireless switching network by performing the operations of starting an audio session by the audio appliance; establishing a connection between the audio appliance to the wireless telecommunication terminal; reserving bandwidth on the wireless switching network; transmitting audio information from a centralized database via a first path on the wireless switching network; and establishing a second path for transmission of audio information upon the first path being interrupted using the reserved bandwidth for the second path.

DETAILED DESCRIPTION

One embodiment of the invention allows a high-level session established for hosting the transfer of data between a cell-phone and a wireless switching system while it maintains control over the operations dealing with the processing of the call from the high-level to the low-level. Such that if the call is lost because of RF reception problems, the bandwidth allocated within the cellular spectrum for that call is not reallocated, as it would be the normal situation, but rather is retained so that the call can immediately be set up again. In one embodiment this means that the cellular base station handling the call maintains the same reservation for RF bandwidth once the call is dropped. The high level session then attempts to reestablish this call to the cellular telephone. The actual reestablishment of the connection once it is lost is performed at the cellular network end rather than at the cell telephone side of the call. The reason for this is that the network can control the bandwidth and reuse resources that have been preserved upon the loss of the call to reestablish the call.

In one embodiment of the invention, a session is established between a digital camera that is taking a plurality of photographs and a centralized database to store those photographs. This session is maintained for a long period of time. As the user of the digital camera captures photo images, these photo images are automatically transferred to the database via the high-level session set up via a cellular telephone and cellular network. Since the high-level session will be maintained regardless of momentary interruptions in the RF bandwidth, the user can proceed to take photographs without being aware of the transfer of these photographs to the database. This embodiment allows the user to have a virtual unlimited memory for the recording of digital photos since the information is transferred to the database without any manual intervention of the user.

In another embodiment, the high-level session is established to allow the transmission of audio information such as music or voice to a digital device via the cellular network and cellular telephone. The cellular telephone buffers a certain amount of audio information probably no more than one minute so that even if the call is momentarily lost, it can be reestablished by the cellular network without interrupting the flow of music to the digital device. Clearly, this embodiment could also provide multi-media programming.

Figure 1:
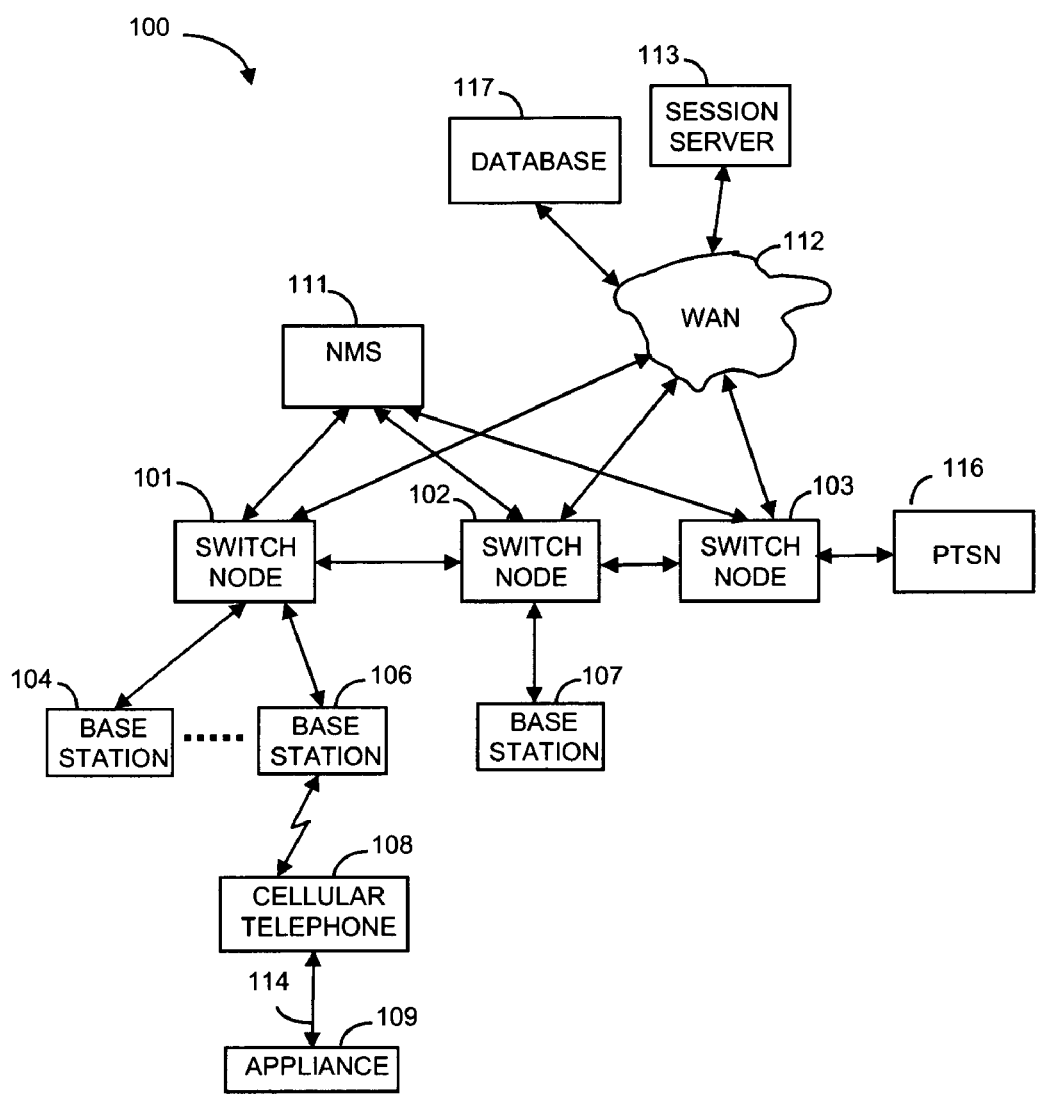
FIG. 1 illustrates a system for implementing an embodiment of the invention.

FIG. 1 illustrates an embodiment of system 100 for implementing the invention. Switching nodes 101-103 and base stations 104-107 with network management system 111 form a cellular/wireless switching system. The wireless switching system is interconnected to public telephone switching network 116. The operation of a wireless switching system such as illustrated in system 100 is described in U.S. Pat. No. 5,521,962 of D. L. Chavez, Jr. This patent is hereby incorporated by reference. One skilled in the art would readily appreciate that other types of cellular switching systems could be utilized for implementing the invention.

When a cellular telephone such as cellular telephone 108 establishes a session for an appliance such as appliance 109, the session is established through base station 106, switch node 108 and wide area network (WAN) 112 to session server 113. Once the cellular telephone starts the session, session server 113 controls the session thereafter. The connection through the wireless switching system is more robust than an ordinary wireless call. The switch node or switching nodes assigned to communicate this call will not release the path until a message is received from session server 113 to do so. In addition, the switch node and base station will not attempt to reuse the wireless bandwidth if cellular telephone 108 is temporarily disconnected but will wait until informed to do so by session server 113 or until cellular telephone 108 registers on a new base station. The base station originally providing service for cellular telephone 108 will attempt to reestablish the connection to cellular telephone 108.

Appliance 109 is interconnected to cellular telephone 108 via link 114. Link 114 may be a wire link or a wireless link. The type of wireless link can be any wireless link known to one skilled in the art. Appliance 109 can be, for an example, a MP3 audio player or a digital camera. If, for example, appliance 109 is a MP3 or other type of audio player, session server 113 is transmitting the audio information to the appliance 109 via the communication link established through the wireless switching system and WAN 118. Session server 113 may obtain the audio information from database 117. If, for example, appliance 109 is a digital camera, then the information is being uploaded from the digital camera via link 114 and the wireless system plus WAN 112 as pictures are taken. Session server 113 then will store these pictures so as not to utilize an excessive amount of digital storage space within the digital camera. Session server 113 may also transfer the pictures to database 117 after the session is over or while the session is in progress. Advantageously, the digital camera may be a video or still digital camera or a combination of both.

Figure 2:
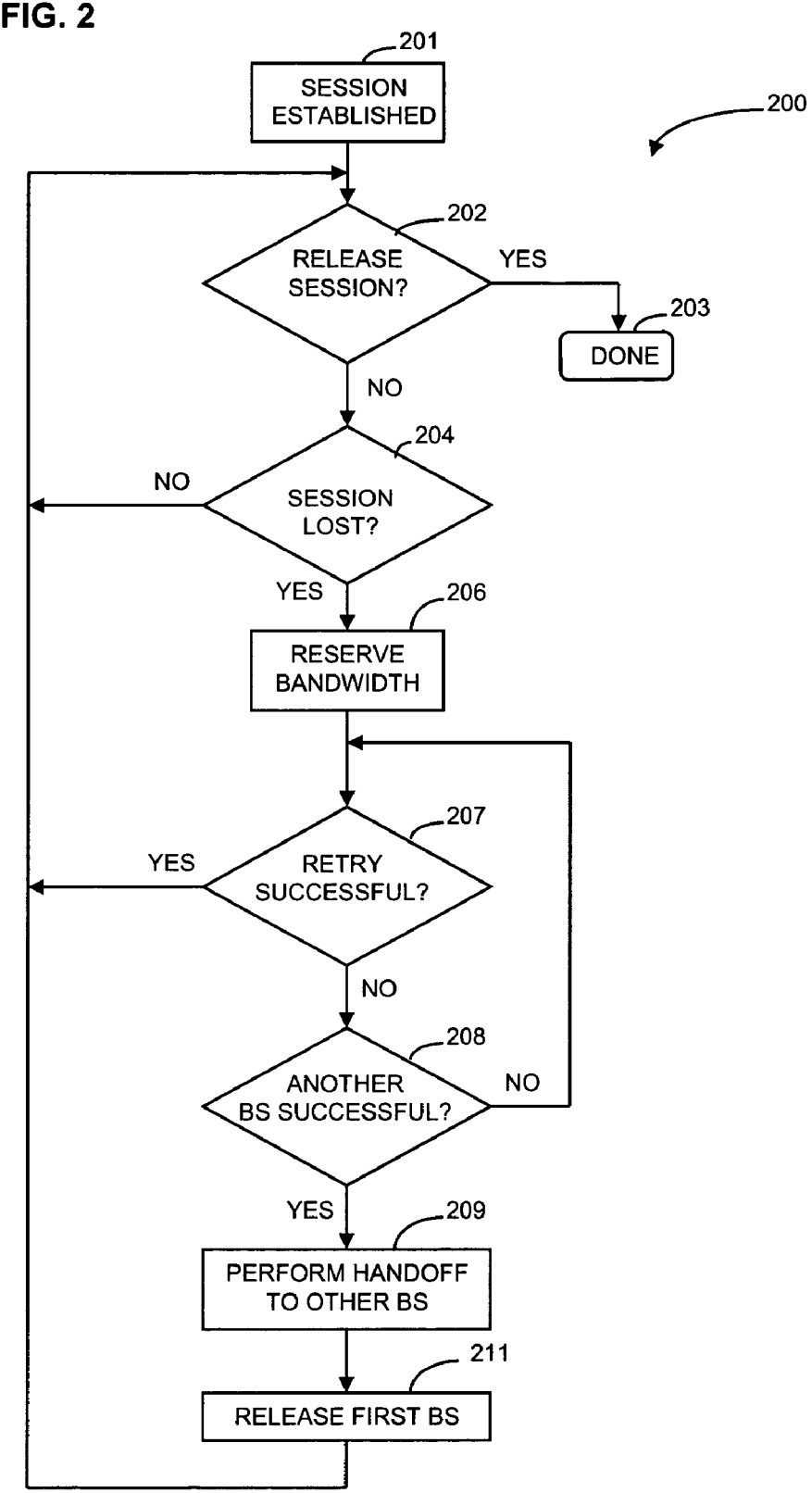
FIG. 2 illustrates, in flowchart form, operations performed by an embodiment of a session executing on a session server.

FIG. 2 illustrates, in flowchart form, an embodiment of operations performed to maintain a session once the session has been established between a cellular telephone and session server 113. After the session is established in block 201, decision block 202 determines if the session has been released or terminated by the session server. If the answer is yes, the operations illustrated in FIG. 2 are done, and control is transferred from decision block 202 to block 203. If the answer in decision block 202 is no, decision block 204 determines if the session has been lost i.e. if the connection through the wireless system or the WAN has been interrupted. If the answer is no, control is transferred back to decision block 202.

If the answer in decision block 204 is yes, block 206 reserves the bandwidth such that the base station or switching node/switching nodes involved in the communication path will not attempt to reuse this bandwidth before transferring control to decision block 207. Decision block 207 continues to determine if the connection has been reestablished. If the answer in decision block 207 is yes, control is transferred back to decision block 202. If the answer in decision block 207 is no, decision block 208 determines if the cellular telephone has registered on another base station. This other base station may be connected to the same switching node as the original base station or may be connected to another base station. If the answer in decision block 208 is no, control is transferred back to decision block 207. If the answer in decision block 208 is yes, block 209 performs the handoff to the other base station, and block 211 releases the first/original base station before control is transferred back to decision block 202.

Figure 3:
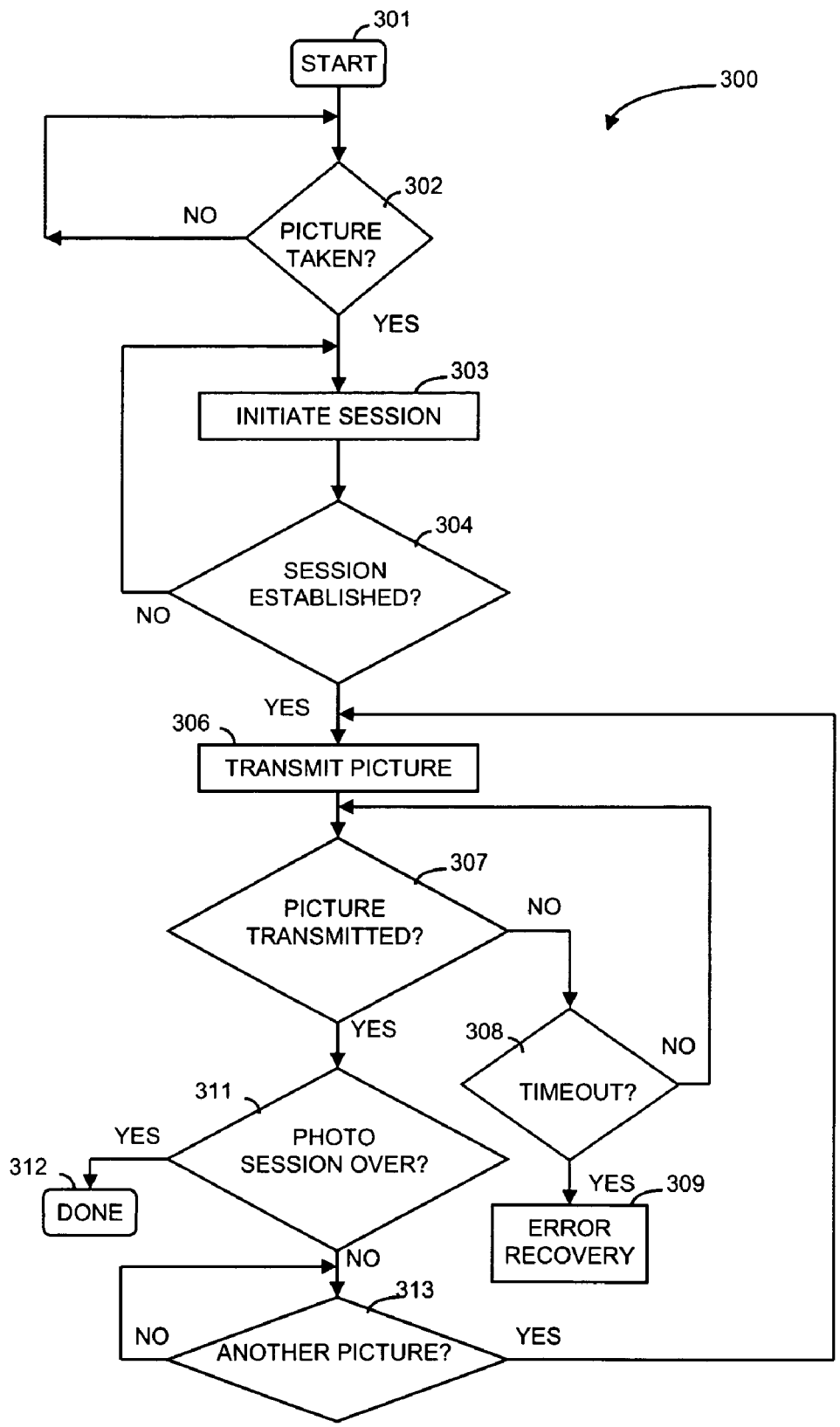
FIG. 3 illustrates, in flowchart form, operations performed by an embodiment of a session operating on a cellular telephone supporting a digital camera.

FIG. 3 illustrates, in flowchart form, operations performed by an embodiment for transferring pictures from a digital camera to a session server. After operations are started in block 301, decision block 302 determines if a picture has been taken. If the digital camera is a video camera this means that one of the sequence of video images is ready to be transferred to the session server. If the answer in decision block 302 is no, control is transferred back to block 302. If the answer in decision block 302 is yes, control is transferred to block 303 which initiates the session. After execution of block 303, decision block 304 waits for the session to be fully established. If the answer in decision block 304 is no, control is transferred back to block 303. If the answer in decision block 304 is yes, block 306 transmits the picture to the session server before transferring control to decision block 307.

Decision block 307 determines if the picture has been transmitted. If the answer is no in decision block 307, decision block 308 determines if a time out has occurred. This time out interval will normally be a long interval of time. If the answer in decision block 308 is yes, block 309 performs error recovery. If the answer in decision block 308 is no, control is transferred back to decision block 307. If the answer in decision block 307 is yes, decision block 311 determines if the photo session is over. If the answer is yes, block 312 terminates the session. If the answer is no in decision block 311, decision block 313 determines if another picture has been taken. When another picture has been taken, control is transferred back to block 306.

Figure 4:
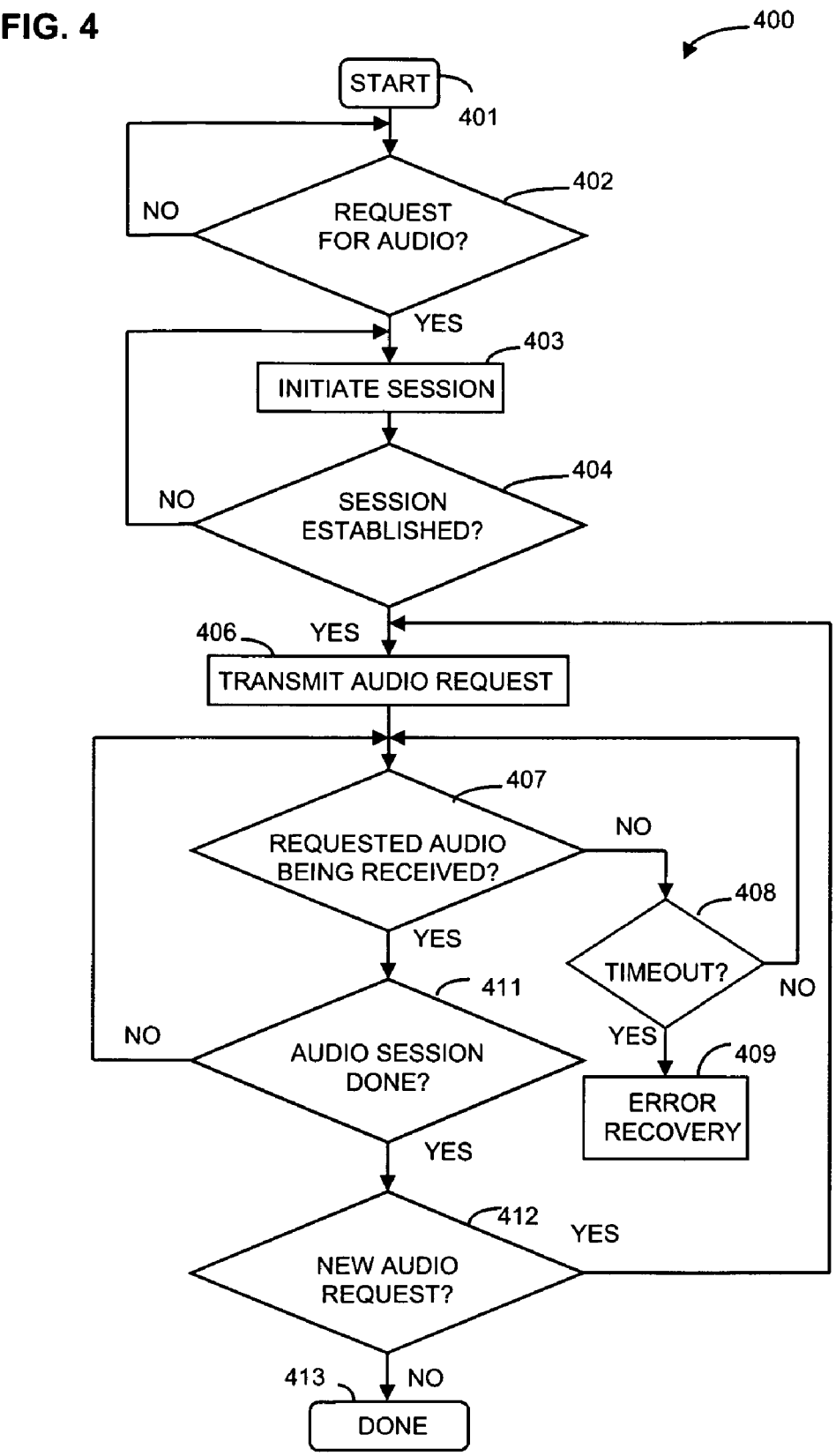
FIG. 4 illustrates, in flowchart form, operations performed by an embodiment of a session operating on a cellular telephone supporting an audio appliance.

FIG. 4 illustrates, in flowchart form, operations performed by an embodiment 400 for transferring audio information from a session server to an audio appliance via a cellular telephone. After the operations are started in block 401, decision block 402 determines if there has been a request for audio information received. This request for audio information may take a variety of forms. For example, the user may want to continue listening to an audio book that is stored on the session server or a database or the user may want to listen to an album. It is the session server's responsibility to determine from the information received the type of audio information that is being requested. If the answer is no in decision block 402, decision block 402 is re-executed. If the answer is yes in decision block 402, block 403 attempts to initiate the session before transferring control to decision block 404. The latter decision block determines if the session has been established. If the answer is no, control is transferred back to block 403. If the answer in decision block 404 is yes, block 406 transmits the audio request to the session server before transferring control to decision block 407.

Decision block 407 determines if the requested audio is being received. If the answer is no, control is transferred to decision block 408 which determines if a time out has occurred. If the answer is yes in decision block 408, block 409 executes error recovery. If the answer is no in decision block 408, control is transferred back to decision block 407.

If the answer is yes in decision block 407, block 411 determines if the requested audio session is done. If the answer is no, control is transferred back to decision block 407. If the answer is block 411 is yes, decision block 412 determines whether there is a request for new audio information. If the answer is no, the process terminates in block 413. If the answer is yes in decision block 412, control is transferred back to block 406.

Figure 5:
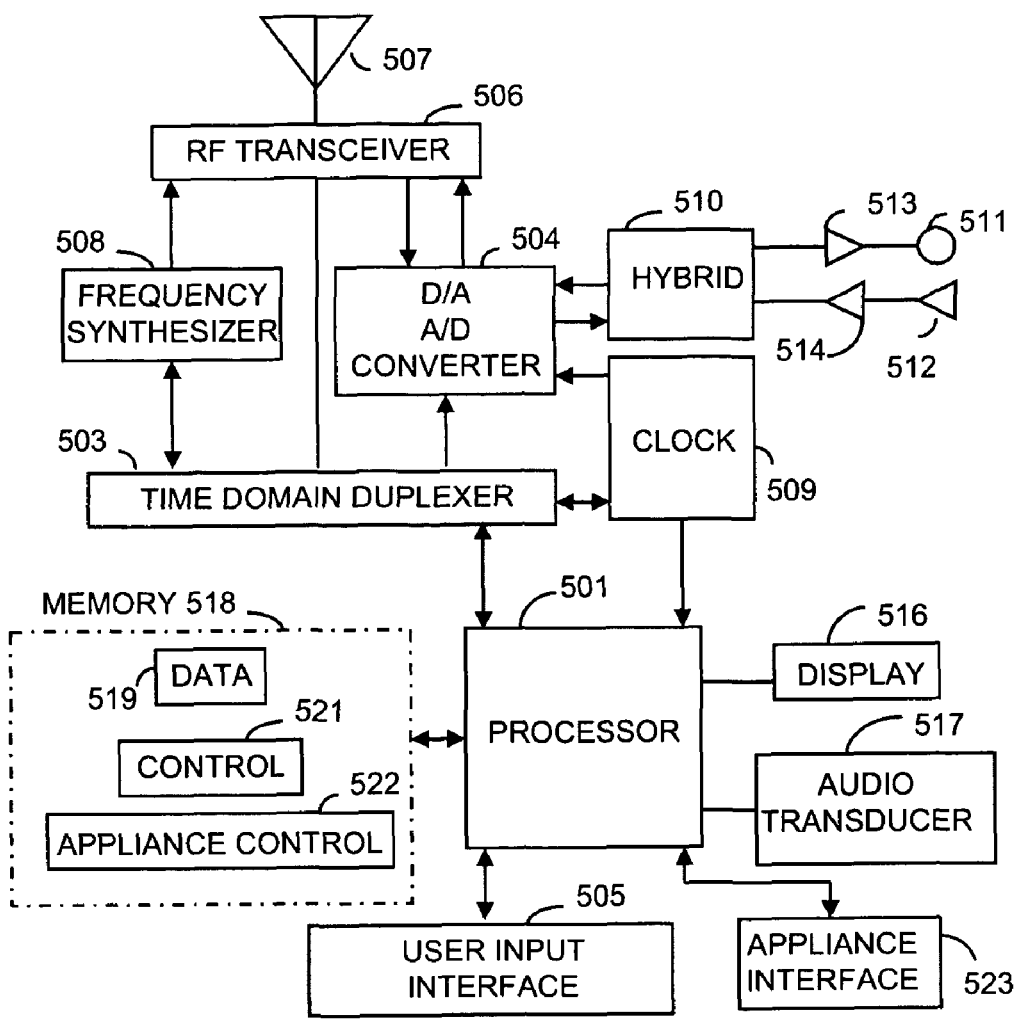
FIG. 5 illustrates, in block diagram form, a cellular or wireless telephone handset.

FIG. 5 illustrates, in block diagram form, an embodiment 500 of a cellular telephone handset. Elements 503-508 along with clock 509 provide the basic radio frequency functions. Clock 509 provides timing for the basic radio frequency functions as well as providing clock signals for processor

501. Hybrid 510 and elements 511-514 provide audio output and input for a user. Audio transducer 517 provides either an audio or vibrating alerting signal to the user for different types of situations of which processor 501 wishes to make the user aware. Display 516 is utilized to display information to the user by processor 501. User input interface 505 provides the basic interface by which a user signals processor 501 of the wishes of the user. User interface 505 may include, but is not limited to, a keypad, distinct buttons, and a menu actuation pad. Processor 501 controls the overall operation of the cellular telephone handset by executing control routine 521 in memory 518. The appliance control functions are performed by processor 501 executing routine 522. Data 519 stores the data that processor 501 utilizes to perform its functions.

Figure 6:
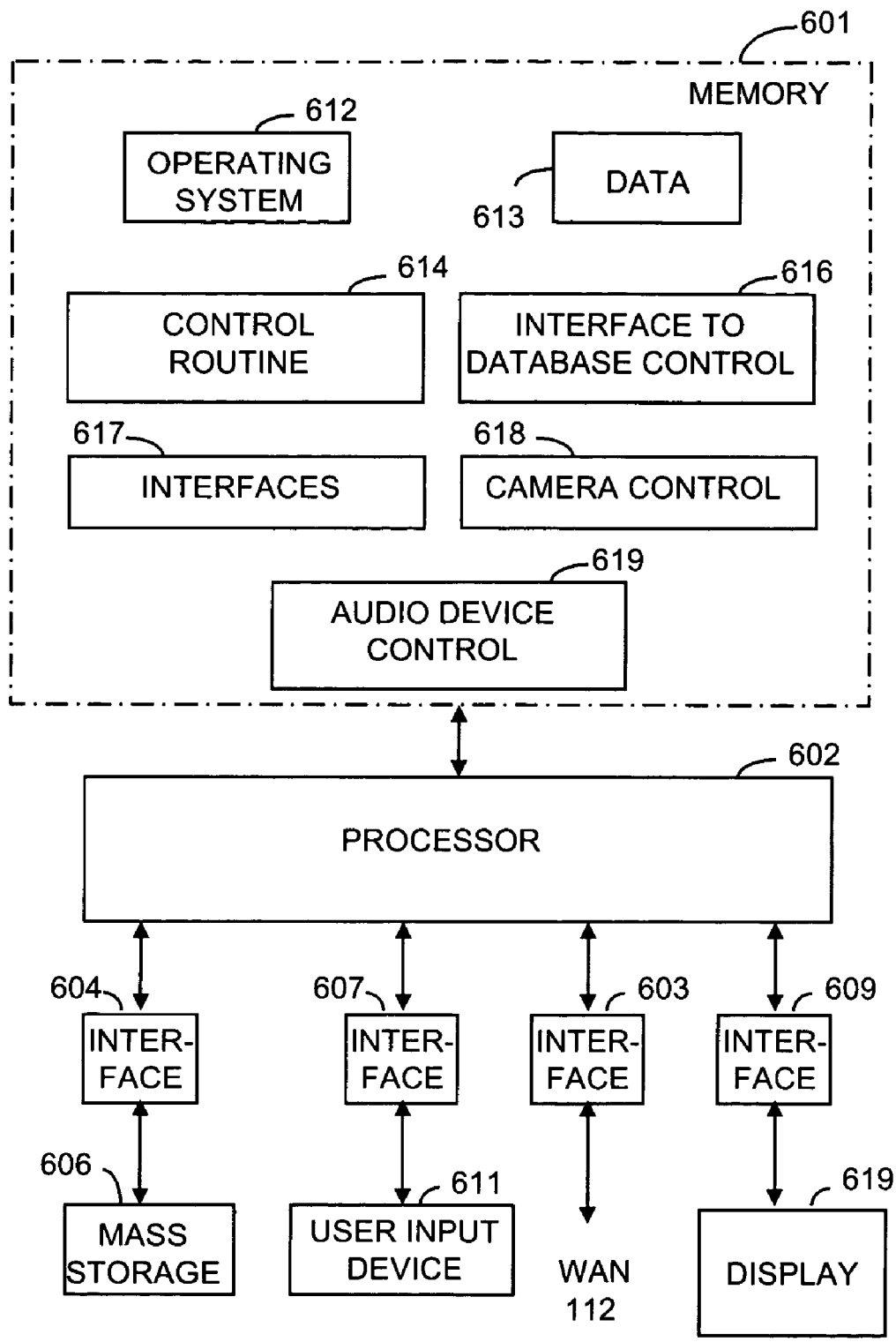
FIG. 6 illustrates, in block diagram form, an embodiment of a session server.

FIG. 6 illustrates, in block diagram form 600, one embodiment of session server 113. Processor 602 provides the overall control for the functions of a session server by executing programs and storing and retrieving data from memory 601. Processor 602 connects to WAN 112 via interface 603. Processor 602 interfaces to user input device 611 via interface 607 and connects to display 619 via interface 609.

Processor 602 performs the operations of a session server by executing the routines illustrated in memory 601. Operating system provides overall control. Control routine 614 provides overall session control. Interface to database control controls the interaction with a remote database. Interfaces 617 provide control over interfaces 603, 604, 607, and 609. Camera control 618 performs control when the appliance is a digital camera via the session. Audio device control 619 performs control when the appliance is an audio device via the session.

Figure 7:
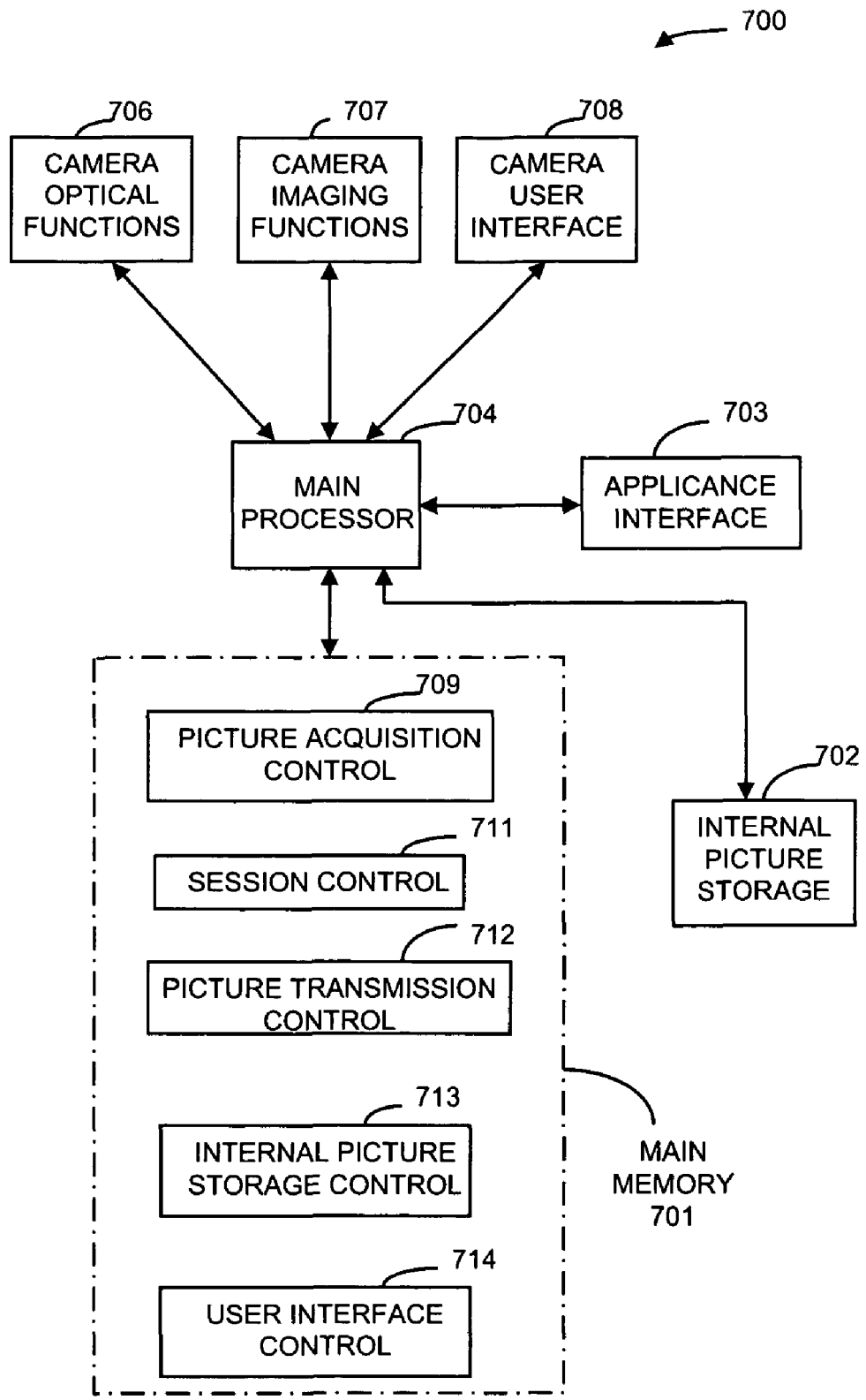
FIG. 7 illustrates, in block diagram form, an embodiment of a digital camera.

FIG. 7 illustrates, in block diagram form, an embodiment 700 of a digital camera. Main processor 704 provides the overall control of the camera's operation by execution of programs stored in main memory 701. In addition, main processor 704 may utilize internal picture storage 702 for the storage of digital pictures and other information. Internal picture storage 702 may be permanently part of the digital camera or may be a removable memory element. Appliance interface 703 provides the interface to the cellular telephone. This interface may be wireless or wired and if wireless may be any known wireless media known to those skilled in the art.

Camera optical functions 706 includes the lens, focusing mechanism, zoom mechanism, etc. as are well known to those skilled in the art. Camera imaging function 707 includes the imaging sensor as well as the processing logic needed to process the digital image received from the imaging sensor. Normally this processing logic is one or more digital signal processors, although it is also known for the imaging processing to be performed by main processor 704. Camera user interface 708 provides the mechanism that allows the user to input information and receive information from the digital camera. This type of a camera user interface is well known in the art and normally consists of a variety of buttons for inputting information and a display screen for receiving information from the digital camera. The user of the digital camera uses the camera user interface 708 to a request a session for the transfer of photos be established.

Main processor 704 controls the operations of the digital camera by executing routines stored in main memory 701. User interface control routine 714 provides control over the camera user interface 708. Internal picture storage control routine 713 controls the storage and accessing of pictures in internal picture storage 702. Session control routine 711 is responsible for the establishment of a session with the session server. Picture acquisition control routine 709 controls the acquisition of digital images by performing overall control of camera optical logic 706 and camera imaging functions 707.

Figure 8:
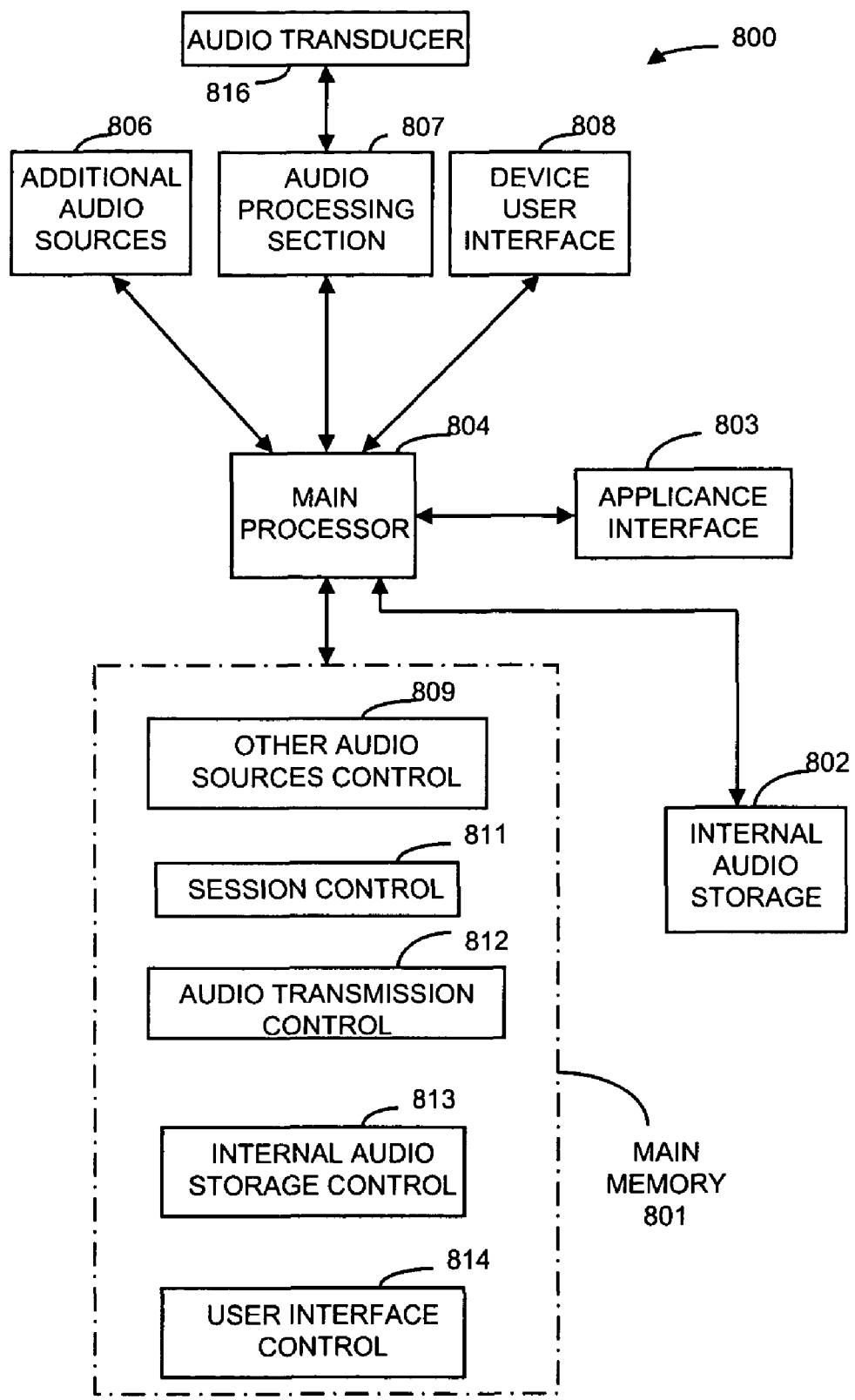
FIG. 8 illustrates, in block diagram form, an embodiment of an audio device.

FIG. 8 illustrates, in block diagram form, an embodiment 800 of an audio appliance for producing audio information either from audio information received from a session server, additional audio sources 806 or audio information stored in internal audio storage 802. Overall control of the audio appliance is performed by main processor 804 executing routines stored in main memory 801. Under control of main processor 804, audio processing section 807 takes digital information converts it to analog information and reproduces it on audio transducer 816.

Additional audio sources 806 can include, but is not limited to, such audio sources as a CD deck, tape deck, radio tuner, etc. Device user interface 808 is an interface that allows the user to input information and to receive information from main processor 804. The user of the audio appliance uses device user interface 808 to initiate a session and to request specific audio content. Internal audio storage 802 may be a random access memory or a hard drive. Appliance interface 803 supports the link to the cellular telephone. Appliance interface 803 may be wireless or hardwired and may utilize any protocol known to those skilled in the art.

Main processor 804 controls the operation of the audio appliance by execution of routines stored in main memory 801. User interface control routine 814 is executed to receive and transmit information to the user via device user interface 808. Internal audio storage control routine 813 is used to control the storage and accessing of audio information stored in internal audio storage 802. Audio transmission control routine 812 performs the overall control of audio processing section 807. Session control routine 811 is responsible for the establishment and maintaining the session via the cellular telephone to the session server. Other audio sources control routine 809 performs the control of the additional audio sources of block 806.

When the operations of a server or appliance are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The server or appliance can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the server or appliance is implemented in hardware, the server or appliance can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method for transmission of digital images via a wireless switching network, comprising the steps of:
    starting to capture digital images for a photo session by a digital camera;
    connecting by the digital camera to a wireless telecommunication terminal where the digital camera is separate from the wireless telecommunication terminal;
    interconnecting the digital camera to the wireless switching network by the wireless telecommunication terminal by interacting with a wireless network controller controlling the wireless switching network;
    initiating the photo session with a session server by the digital camera via the wireless network and wireless telecommunication terminal;
    reserving bandwidth on the wireless switching network by the session server interacting with the wireless network controller;
    automatically transmitting digital images by the digital camera as each of the digital images is captured to a centralized database without user intervention via a first path on the wireless switching network and the session server;
    maintaining by the session server a base station of the wireless switching network used by the first path if the first path is interrupted using the reserved bandwidth until a different base station interconnects the wireless telecommunication terminal to the wireless switching network; and
    establishing by the session server a second path for transmission of digital images upon the first path being interrupted and the wireless telecommunication terminal interconnecting to the wireless switching network via a different base station using the reserved bandwidth for the second path wherein the second path uses the different base station of the wireless switching network than the first path.

2. The method of claim 1 further comprises the step of determining an end of the photo session.

3. An apparatus comprising a digital camera for implementing the method of claim 2.

4. The method of claim 1 wherein the step of transmitting comprises the step of buffering digital image information of the digital images by the wireless telecommunication terminal.

5. An apparatus comprising a digital camera for implementing the method of claim 4.

6. An apparatus comprising a digital camera for implementing the method of claim 1.

7. A method for transmission of audio information to an audio appliance connected to a wireless telecommunication terminal via a wireless switching network, comprising the steps of:
    starting an audio session by the audio appliance wherein a duration of the audio session includes all time that a user of the audio appliance listens to audio information received during the audio session;
    establishing by the audio appliance a connection between the audio appliance to the wireless telecommunication terminal wherein the connection remains during the duration of the audio session;
    interconnecting the audio appliance to the wireless switching network by the wireless telecommunication terminal by interacting with a wireless network controller controlling the wireless switching network wherein the interconnection remains during the duration of the audio session;
    initiating the audio session with a session server by the audio appliance via the wireless network and wireless telecommunication terminal;
    reserving bandwidth on the wireless switching network by the session server interacting with the wireless network controller wherein the bandwidth remains reserved during the duration of the audio session;
    transmitting the audio information from a centralized database via a first path on the wireless switching network to the wireless telecommunication terminal during the duration of the audio session wherein the wireless telecommunication terminal only partially buffers the audio information before transferring the audio information to the audio appliance which immediately starts to play the audio information;
    maintaining by the session server a base station of the wireless switching network used by the first path if the first path is interrupted using the reserved bandwidth until a different base station interconnects the wireless telecommunication terminal to the wireless switching network; and
    establishing by the session server a second path for transmission of audio information upon the first path being interrupted and the wireless telecommunication terminal interconnecting to the wireless network via a different base station using the reserved bandwidth for the second path wherein the second path uses a different base station of the wireless switching network than the first path.

8. The method of claim 7 further comprises the step of determining an end of the audio session.

9. An apparatus comprising an MP3 audio player for implementing the method of claim 8.

10. The method of claim 7 wherein the step of transmitting comprises the step of buffering a portion of the audio information by the wireless telecommunication terminal.

11. An apparatus comprising an MP3 audio player for implementing the method of claim 10.

12. An apparatus comprising an MP3 audio player for implementing the method of claim 7.

13. A non-transitory computer-readable medium for transmission of digital images via a wireless switching network, comprising computer-executable instructions configured:

starting to capture digital images for a photo session by a digital camera;

connecting the digital camera to a wireless telecommunication terminal where the digital camera is separate from the wireless telecommunication terminal;

interconnecting the digital camera to the wireless switching network by the wireless telecommunication terminal by interacting with a wireless network controller controlling the wireless switching network;

initiating the photo session with a session server by the digital camera via the wireless network and wireless telecommunication terminal;

reserving bandwidth on the wireless switching network by the session server interacting with the wireless network controller;

automatically transmitting digital images by the digital camera as each of the digital images is captured to a centralized database without user intervention via a first path on the wireless switching network and the session server;

maintaining by the session server a base station of the wireless switching network used by the first path if the first path is interrupted using the reserved bandwidth until a different base station interconnects the wireless telecommunication terminal to the wireless switching network; and establishing by the session server a second path for transmission of digital images upon the first path being interrupted and the wireless telecommunication terminal interconnecting to the wireless switching network via a different base station using the reserved bandwidth for the second path wherein the second path uses the different base station of the wireless switching network than the first path.

14. The non-transitory computer-readable medium of claim 13 further comprises the computer-executable instructions for determining an end of the photo session.

15. The non-transitory computer-readable medium of claim 13 wherein the computer-executable instructions for transmitting comprises the computer-executable instructions for buffering digital image information of the digital images by the wireless telecommunication terminal.

16. A non-transitory computer-readable medium for transmission of audio information to an audio appliance connected to a wireless telecommunication terminal via a wireless switching network, comprising computer-executable instructions configured:

starting an audio session by the audio appliance wherein a duration of the audio session includes all time that a user of the audio appliance listens to audio information received during the audio session;

establishing by the audio appliance a connection between the audio appliance to the wireless telecommunication terminal wherein the connection remains during the duration of the audio session;

interconnecting the audio appliance to the wireless switching network by the wireless telecommunication terminal by interacting with a wireless network controller controlling the wireless switching network wherein the interconnection remains during the duration of the audio session;

initiating the audio session with a session server by the audio appliance via the wireless network and wireless telecommunication terminal;

reserving bandwidth on the wireless switching network by the session server interacting with the wireless network controller wherein the bandwidth remains reserved during the duration of the audio session;

transmitting the audio information from a centralized database via a first path on the wireless switching network to the wireless telecommunication terminal during the duration of the audio session wherein the wireless telecommunication terminal only partially buffers the audio information before transferring the audio information to the audio appliance which immediately starts to play the audio information;

maintaining by the session server a base station of the wireless switching network used by the first path if the first path is interrupted using the reserved bandwidth until a different base station interconnects the wireless telecommunication terminal to the wireless switching network; and establishing by the session server a second path for transmission of audio information upon the first path being interrupted and the wireless telecommunication terminal interconnecting to the wireless network via a different base station using the reserved bandwidth for the second path wherein the second path uses a different base station of the wireless switching network than the first path.

17. The non-transitory computer-readable medium of claim 16 further comprises computer-executable instructions for determining an end of the audio session.

* * * * *